J. F. APPLEBY.
VEHICLE.
APPLICATION FILED NOV. 6, 1911.
1,107,874.
Patented Aug. 18, 1914.
2 SHEETS—SHEET 1.
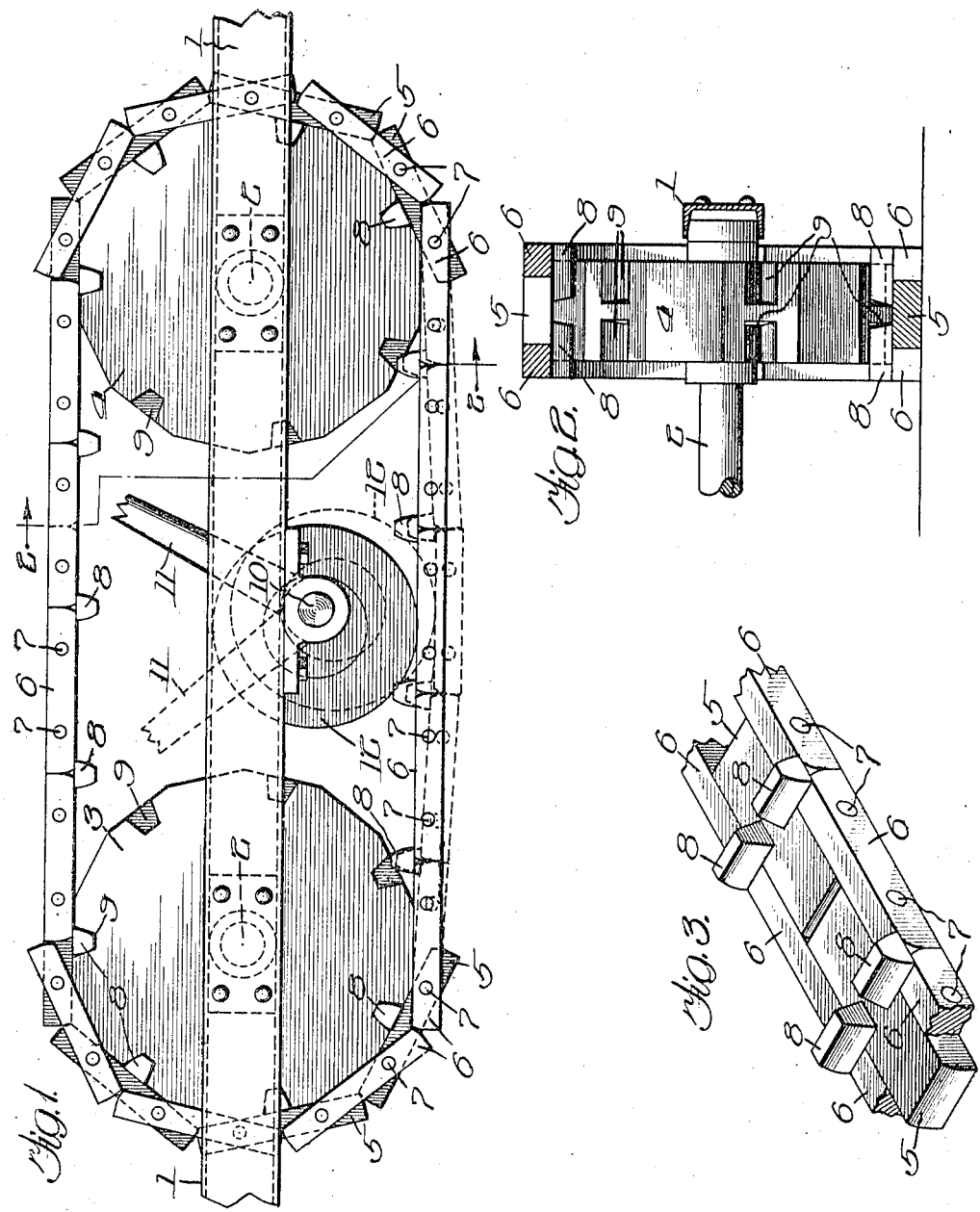
Witnesses
Jno. H. Nelson Jr.
Edwin B. Nelson
Inventor:
John F. Appleby.
By G. K. Cragg
Atty.

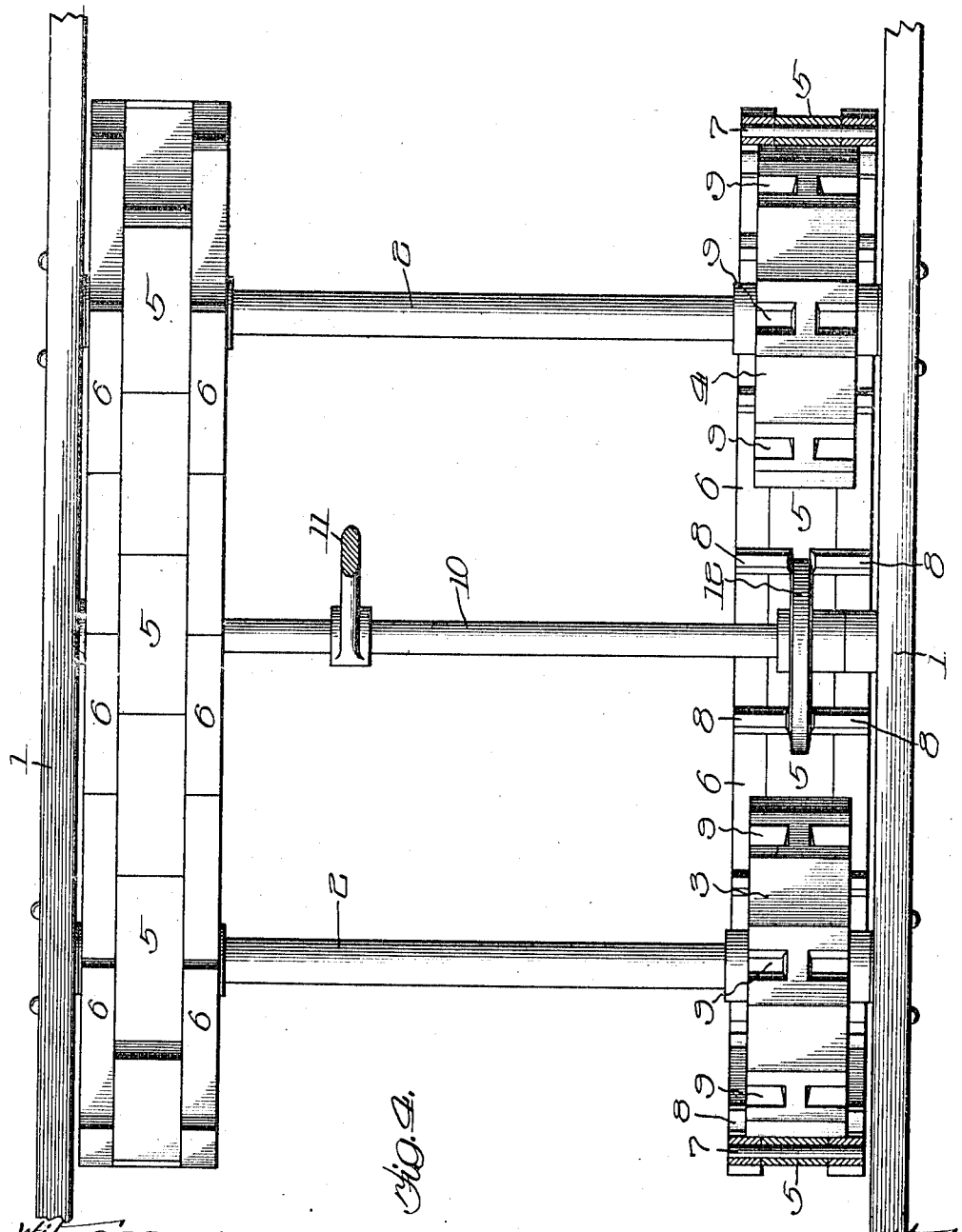

UNITED STATES PATENT OFFICE.

JOHN F. APPLEBY, OF CHICAGO, ILLINOIS, ASSIGNOR, BY MESNE ASSIGNMENTS, TO BULLOCK TRACTOR COMPANY, OF CHICAGO, ILLINOIS, A CORPORATION OF ILLINOIS.

VEHICLE.

1,107,874.  Specification of Letters Patent.  Patented Aug. 18, 1914.

Application filed November 6, 1911. Serial No. 658,711.

*To all whom it may concern:*

Be it known that I, JOHN F. APPLEBY, citizen of the United States, residing at Chicago, in the county of Cook and State of Illinois, have invented a certain new and useful Improvement in Vehicles, of which the following is a full, clear, concise, and exact description, reference being had to the accompanying drawings, forming a part of this specification.

My invention relates to vehicles employing wheels that travel upon endless tracks which are laid by the vehicles as they proceed.

My invention has for one of its objects the provision of improved means whereby the lower stretches of the tracks are prevented from bulging upwardly so that no auxiliary means are required for maintaining the lower stretches of the endless tracks in suitable shape to be ridden upon by the vehicle wheels.

My invention has for another of its objects the provision of adjusting means for depressing the lower stretches of the endless tracks that pass between the forward and rear vehicle wheels whereby the areas of contact of the tracks with the ground are reduced so that the course of the vehicle may more readily be deflected or turned. This latter object of my invention is desirably realized in connection with the same construction which fulfils the first object of the invention but I do not wish to limit my invention to a construction that is adapted to fulfil both of these objects.

My invention has other characteristics which, together with the characteristics above generally described, are shown in the accompanying drawings in connection with which my invention will be more fully described. These drawings show one embodiment of the invention, to which embodiment I do not limit myself, and in the drawings—Figure 1 is a side elevation of a sufficient portion of a vehicle structure to render an understanding of my invention clear; Fig. 2 is a cross sectional view taken on line 2 2 of Fig. 1, but one of the track structures and but one of the vehicle wheels, however, being shown; Fig. 3 is a perspective view of a portion of the endless track structure which I preferably employ; and Fig. 4 is a plan view, partially in section, of the structure illustrated in Fig. 1.

Like parts are indicated by similar characters of reference throughout the different figures.

I have illustrated the side rails 1 of the framework of a vehicle wheel truck, these side rails supporting shafts 2 upon which the rear and forward vehicle wheels 3 and 4 are disposed, these wheels, or some of them, being suitably power driven so that they may roll upon the endless tracks which are provided therefor. As it is old to drive vehicle wheels that ride upon endless tracks, it will be unnecessary to illustrate or describe any of the well known means for driving such vehicle wheels. As there are two sets of vehicle wheels of two wheels each upon each side of the vehicle, two endless tracks are provided one upon each side of the vehicle.

Each endless track, in the embodiment of the invention illustrated, includes an intermediate row of links 5 flanked by two outer rows of links 6, the adjacent links 5 being linked together by said links 6 which are pivotally connected with adjacent ends of adjacent links 5 by pins 7, all of the links through which the pins 7 pass being desirably movable about said pins. Each link 5 thus has two pins 7 passed through the same near its ends and each link 6 thus has two pins 7 passing through it near its ends. The links 5 and 6, by their relative arrangement, are united to form an endless chain which constitutes a vehicle track.

In order to prevent the bottom stretch of each track from rising above the level it should keep, I equip the inner edges of some of the links, preferably the links 5, with lugs 8 that are cast integrally with the links 5 and which project laterally of these links to overlie adjacent ends of adjacent links 6 so as to limit the upward movements of the adjacent ends of adjacent links 6 with respect to the links 5, by which limitation of movement of the links 6, upward movement of adjacent ends of the links 5 is also limited. In the preferred embodiment of the invention the coöperation of the lugs 8 with the links is preferably such that the lower stretch of the tracks upon which the vehicle wheels operate is in a single plane, that is the treads of the tracks upon which the vehicle wheels turn do not bend upwardly. While the lugs 8 are preferably integrally formed with the links 5 and project over adjacent ends of adjacent links 6 for the purpose which has been described, I do not wish to be limited to the location of the lugs, in all embodiments of the invention. The lugs, in addition to the function which has been described for them, also desirably act as teeth receivable within teeth receiving recesses 9 provided in the vehicle wheels. As illustrated, each link 5 carries two transversely alined teeth 8 adapted to be received within transversely alined recesses 9.

In order that the area of contact of the lower stretches of the endless tracks with the ground may be reduced when it is desired to turn the vehicle, I provide depressing mechanism for engaging the upper surfaces of the lower stretches of the tracks, which depressing mechanism is illustrated in Figs. 1 and 4. The depressing mechanism, as it is preferably constructed, includes a shaft 10 which may be turned about a fixed axis by a hand lever 11. A disk 12 is fixed upon each end of the shaft and is located in alinement with the spaces between the lugs or teeth 8 and is of a thickness to be receivable in the spaces between the lugs so that said disks are always in position to engage the links 5 directly. The disks 12 are eccentric with respect to the shaft 10, the disks being of such diameter and their eccentricity being of such degree that the tracks may assume a straight level position when the disks are in the position shown by full lines in Fig. 1, the disks forcing the depression of the tracks as indicated in Fig. 1 by dotted lines when the disks are shifted to the position indicated by dotted lines.

Having thus described my invention, I claim as new and desire to secure by Letters Patent the following:—

1. A vehicle including an endless track passing about wheels of the vehicle and which track is formed of a plurality of rows of links disposed lengthwise of the track and side by side, each link in each row being pivotally connected at its ends with the adjacent ends of adjacent links in a companion row, some of the links being provided with lugs upon the tread side of the track in position to engage adjacent ends of companion links laterally disposed with respect to the links carrying the lugs whereby the extent to which the track may be flexed inwardly is limited.

2. A vehicle including an endless track passing about wheels of the vehicle and which track is formed of a plurality of rows of links disposed lengthwise of the track and side by side, each link in each row being pivotally connected at its ends with the adjacent ends of adjacent links in a companion row, some of the links being provided with lugs in position to engage adjacent ends of companion links laterally disposed with respect to the links carrying the lugs to limit the extent to which the track may be flexed inwardly.

3. A vehicle including an endless track passing about wheels of the vehicle and which track is formed of a plurality of rows of links disposed lengthwise of the track and side by side, each link in each row being pivotally connected at its ends with the adjacent ends of adjacent links in a companion row, some of the links being provided with lugs upon the tread side of the track in position to engage adjacent links laterally disposed with respect to the links carrying the lugs to limit the extent to which the track may be flexed inwardly.

4. A vehicle including an endless track passing about wheels of the vehicle and which track is formed of a plurality of rows of links disposed lengthwise of the track and side by side, each link in each row being pivotally connected at its ends with the adjacent ends of adjacent links in a companion row, some of the links being provided with lugs upon the tread side of the track in position to engage adjacent ends of companion links laterally disposed with respect to the links carrying the lugs whereby the extent to which the track may be flexed inwardly is limited, said lugs constituting teeth which are received within recesses provided in the vehicle wheels as these wheels roll upon the track.

5. A vehicle including an endless track passing about wheels of the vehicle and which track is formed of a plurality of rows of links disposed lengthwise of the track and side by side, each link in each row being pivotally connected at its ends with the adjacent ends of adjacent links in a companion row, some of the links being provided with lugs upon the tread side of the track in position to engage adjacent links laterally disposed with respect to the links carrying the lugs to limit the extent to which the track may be flexed inwardly, said lugs constituting teeth which are received within recesses provided in the vehicle wheels as these wheels roll upon the track.

6. A vehicle including an endless track passing about wheels of the vehicle and which track is formed of links, certain of which are provided with lugs which engage links that are laterally disposed with respect to the lug carrying links for limiting the extent to which the track may be flexed, said lugs constituting teeth which are received within recesses provided in the vehicle wheels as these wheels roll upon the track.

7. A vehicle including an endless track passing about wheels of the vehicle and which track is formed of links, certain of which are provided with lugs upon the tread side of the track that engage links laterally disposed with respect to the links carrying the lugs for limiting the extent to which the track may be flexed inwardly, said lugs constituting teeth which are received within recesses provided in the vehicle wheels as these wheels roll upon the ground.

In witness whereof, I hereunto subscribe my name this 4th day of November A. D., 1911.

JOHN F. APPLEBY.

Witnesses:
G. L. CRAGG,
E. L. WHITE.